United States Patent
Riechel

(10) Patent No.: US 11,260,472 B2
(45) Date of Patent: Mar. 1, 2022

(54) METHOD AND SYSTEM FOR EXTENDING OPTICS LIFETIME IN LASER PROCESSING APPARATUS

(71) Applicant: ELECTRO SCIENTIFIC INDUSTRIES, INC., Portland, OR (US)

(72) Inventor: Patrick Riechel, Portland, OR (US)

(73) Assignee: Electro Scientific Industries, Inc., Beaverton, OR (US)

(*) Notice: Subject to any disclaimer, the term of this patent is extended or adjusted under 35 U.S.C. 154(b) by 126 days.

(21) Appl. No.: 16/464,551

(22) PCT Filed: Dec. 28, 2017

(86) PCT No.: PCT/US2017/068833
§ 371 (c)(1),
(2) Date: May 28, 2019

(87) PCT Pub. No.: WO2018/126078
PCT Pub. Date: Jul. 5, 2018

(65) Prior Publication Data
US 2021/0107091 A1   Apr. 15, 2021

Related U.S. Application Data

(60) Provisional application No. 62/440,925, filed on Dec. 30, 2016.

(51) Int. Cl.
*B23K 26/082* (2014.01)
*B23K 26/0622* (2014.01)
(Continued)

(52) U.S. Cl.
CPC ........ *B23K 26/082* (2015.10); *B23K 26/0006* (2013.01); *B23K 26/0624* (2015.10);
(Continued)

(58) Field of Classification Search
CPC ............. B23K 26/082; B23K 26/0006; B23K 26/0876; B23K 26/0624; B23K 26/0648; B23K 2101/36
(Continued)

(56) References Cited

U.S. PATENT DOCUMENTS

| 4,912,487 A | 3/1990 | Porter et al. |
| 5,633,747 A | 5/1997 | Nikoonahad |

(Continued)

FOREIGN PATENT DOCUMENTS

| CN | 1388771 A | 1/2003 |
| CN | 1736651 A | 2/2006 |

(Continued)

OTHER PUBLICATIONS

The Office Action issued to the Chinese Application No. 201780078945.7 dated Oct. 29, 2020, 11 pages.
(Continued)

*Primary Examiner* — Thien S Tran
(74) *Attorney, Agent, or Firm* — Kurt M. Eaton

(57) ABSTRACT

Methods and apparatus for extending the lifetime of optical components are disclosed. A beam of laser energy directed along a beam path that intersects a scan lens, through which it can be transmitted. The beam path can be deflected within a scan region of the scan lens to process a workpiece with the laser energy transmitted by the scan lens. The scan region can be shifted to a different location within the scan lens, e.g., to delay or avoid accumulation of laser-induced damage within the scan lens, while processing a workpiece.

17 Claims, 2 Drawing Sheets

(51) Int. Cl.
*B23K 26/00* (2014.01)
*B23K 26/06* (2014.01)
*B23K 26/08* (2014.01)
*B23K 101/36* (2006.01)

(52) U.S. Cl.
CPC ...... *B23K 26/0648* (2013.01); *B23K 26/0876* (2013.01); *B23K 2101/36* (2018.08)

(58) Field of Classification Search
USPC .............. 219/121.6, 121.67, 121.68, 121.69, 219/121.79
See application file for complete search history.

(56) References Cited

U.S. PATENT DOCUMENTS

| | | | |
|---|---|---|---|
| 5,638,267 | A | 6/1997 | Singhouse et al. |
| 5,751,585 | A | 5/1998 | Cutler et al. |
| 5,798,927 | A | 8/1998 | Cutler et al. |
| 5,847,960 | A | 12/1998 | Cutler et al. |
| 5,917,300 | A | 6/1999 | Tanquary et al. |
| 6,314,473 | B1 | 11/2001 | Singer et al. |
| 6,430,465 | B2 | 8/2002 | Cutler |
| 6,700,600 | B1 | 3/2004 | Sandstrom et al. |
| 6,706,998 | B2 | 3/2004 | Cutler |
| 6,706,999 | B1 | 3/2004 | Barrett et al. |
| 6,816,294 | B2 | 11/2004 | Unrath et al. |
| 6,947,454 | B2 | 9/2005 | Sun et al. |
| 7,019,891 | B2 | 3/2006 | Johnson |
| 7,027,199 | B2 | 4/2006 | Johnson |
| 7,133,182 | B2 | 11/2006 | Johnson et al. |
| 7,133,186 | B2 | 11/2006 | Johnson |
| 7,133,187 | B2 | 11/2006 | Johnson |
| 7,133,188 | B2 | 11/2006 | Johnson |
| 7,245,412 | B2 | 7/2007 | Bruland et al. |
| 7,259,354 | B2 | 8/2007 | Pailthorp et al. |
| 7,605,344 | B2 | 10/2009 | Lei et al. |
| 7,611,745 | B2 | 11/2009 | Nishikawa et al. |
| 7,834,293 | B2 | 11/2010 | Wile et al. |
| 8,026,158 | B2 | 9/2011 | Bruland et al. |
| 8,076,605 | B2 | 12/2011 | Bruland et al. |
| 8,158,493 | B2 | 4/2012 | Shah et al. |
| 8,288,679 | B2 | 10/2012 | Unrath |
| 8,404,998 | B2 | 3/2013 | Unrath et al. |
| 8,497,450 | B2 | 7/2013 | Bruland et al. |
| 8,648,277 | B2 | 2/2014 | Alpay et al. |
| 8,680,430 | B2 | 3/2014 | Unrath |
| 8,847,113 | B2 | 9/2014 | Unrath et al. |
| 8,896,909 | B2 | 11/2014 | Sandstrom et al. |
| 8,928,853 | B2 | 1/2015 | Lin et al. |
| 9,259,802 | B2 | 2/2016 | Willey et al. |
| 2002/0153361 | A1* | 10/2002 | Sakamoto .......... B23K 26/0643 219/121.73 |
| 2003/0024913 | A1* | 2/2003 | Downes ............... B23K 26/032 219/121.82 |
| 2008/0121627 | A1* | 5/2008 | Bruland ............. H01L 23/5258 219/121.67 |
| 2010/0078419 | A1 | 4/2010 | Johnsen et al. |
| 2010/0301024 | A1 | 12/2010 | Unrath |
| 2013/0200050 | A1 | 8/2013 | Ehrmann et al. |
| 2013/0201634 | A1 | 8/2013 | Im et al. |
| 2013/0319982 | A1* | 12/2013 | Frankel ................ B23K 26/032 219/121.72 |
| 2014/0026351 | A1 | 1/2014 | Willey et al. |
| 2014/0083983 | A1 | 3/2014 | Zhang et al. |
| 2014/0197140 | A1 | 7/2014 | Unrath |
| 2014/0263201 | A1 | 9/2014 | Unrath |
| 2014/0263212 | A1 | 9/2014 | Zhang |
| 2014/0263223 | A1 | 9/2014 | Unrath |
| 2014/0312013 | A1 | 10/2014 | Frankel et al. |

FOREIGN PATENT DOCUMENTS

| | | |
|---|---|---|
| CN | 1772428 A | 5/2006 |
| CN | 1902025 A | 1/2007 |
| JP | 2001205467 A | 7/2001 |
| JP | 2004361862 A | 12/2004 |
| JP | 4527567 B2 | 8/2010 |
| JP | 2012503556 A | 2/2012 |
| KR | 20150016281 A | 2/2015 |
| TW | 503677 B | 9/2002 |
| TW | 516303 B | 1/2003 |
| WO | WO2009/087392 A1 | 7/2009 |

OTHER PUBLICATIONS

The PCT/US2017/068833, international search report dated Apr. 20, 2018, 3 pages.
The PCT/US2017/068833, written opinion, 8 pages.
The Office Action issued to the Chinese Application No. 201780078945.7 dated Jun. 22, 2021, 9 pages.
Office Action issued to the Korean Application No. 10-2019-7021585 dated Oct. 5, 2021, 5 pages.
Office Action issued to the Chinese Application No. 201780078945.7 dated Oct. 14, 2021, 9 pages.
Office Action issued to the Japanese Application No. 2019-535826 dated Oct. 26, 2021, 4 pages.
Office Action issued to the Taiwanese Application No. 106146527 dated Nov. 8, 2021, 9 pages.

* cited by examiner

METHOD AND SYSTEM FOR EXTENDING OPTICS LIFETIME IN LASER PROCESSING APPARATUS

BACKGROUND

I. Discussion of the Related Art

Within a laser processing apparatus, optical components such as mirrors, lenses (e.g., relay lenses, scan lenses, etc.), beam expanders, etc., are arranged within a beam path along which laser energy can propagate. Over time, the laser energy propagated along the beam path damages the optical components. Commonly, this damage is referred to as "laser-induced damage," and can be manifested as material softening, melting, evaporation, warping, pitting, cracking, shattering, etc.

Generally, and assuming that the energy content of an incident beam of laser energy is sufficiently high, laser-induced damage can occur by thermal absorption of laser energy, by nonlinear absorption (e.g., multiphoton absorption, avalanche ionization, etc.), or a combination thereof. Thermal absorption is typically associated with continuous wave (CW) radiation or laser pulses having pulse durations greater than 10 ms, and laser pulses generated at high pulse repetition rates. Nonlinear absorption arises with the use of high-intensity laser pulses having an ultrashort pulse duration (i.e., typically less than a few 10s of ps in duration). In addition to pulse duration and pulse repetition rate, laser-induced damage can also depend upon one or more other factors such as spatial intensity profile, temporal pulse profile and wavelength of the beam of laser energy.

Traditionally, laser-induced damage to optical components within a laser processing apparatus has been addressed by simply replacing any damaged optical component. The time until an optical component needs to be replaced can be delayed by employing optics purging and debris removal techniques, but optical components will still need to be replaced eventually. In addition, it can be expensive to replace optical components, especially scan lenses.

SUMMARY

Figure 1:
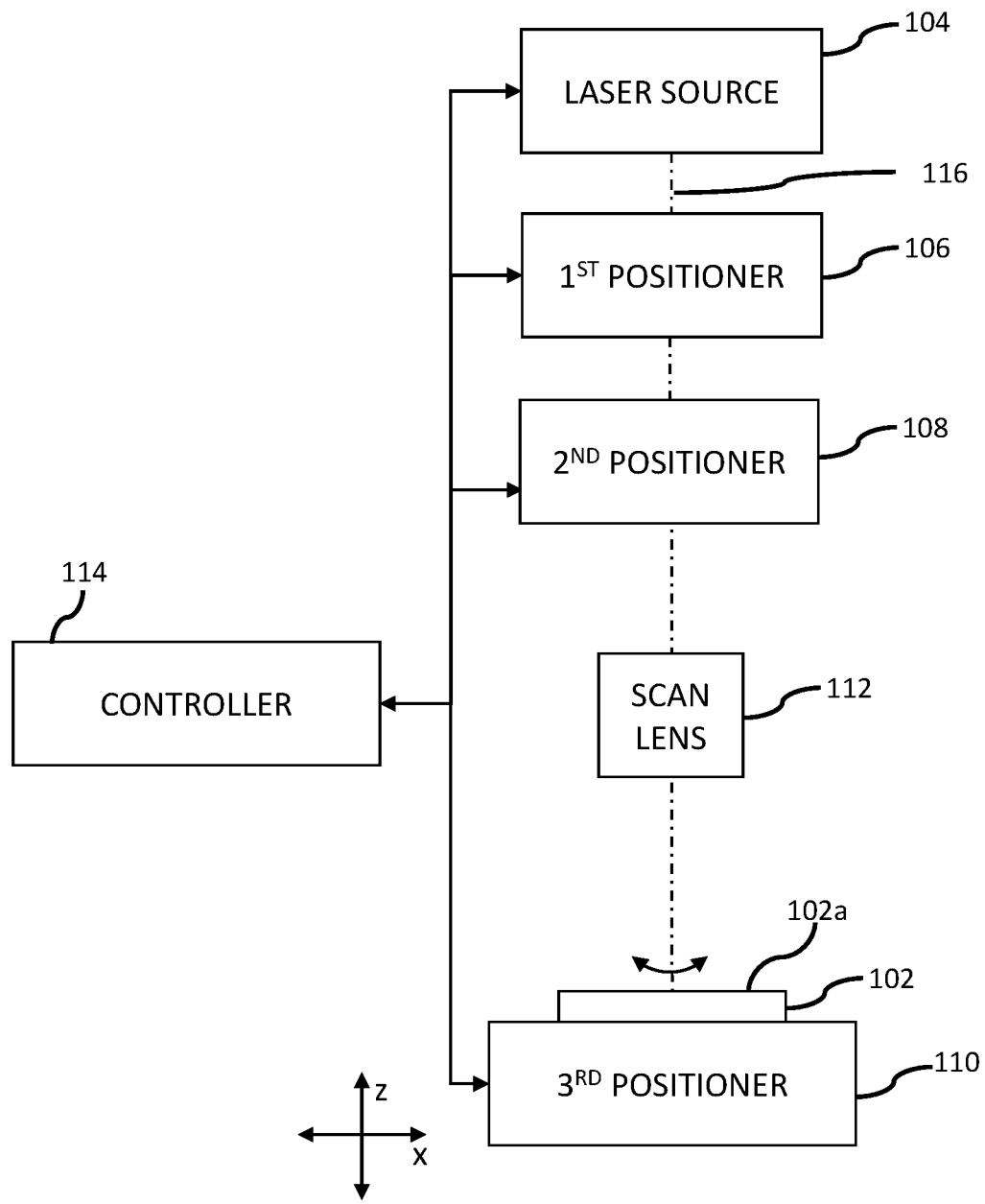
FIG. 1 schematically illustrates an apparatus for processing a workpiece, according to one embodiment.

In one embodiment, a method can be characterized as including: generating a beam of laser energy; directing the beam of laser energy along a beam path that intersects a scan lens; propagating the beam of laser energy through the scan lens; deflecting the beam path within a first region of the scan lens to process a first workpiece with the beam of laser energy propagated through the scan lens; and after deflecting the beam path within the first region of the scan lens, deflecting the beam path within a second region of the scan lens to process a second workpiece with the beam of laser energy propagated through the scan lens.

In another embodiment, a method can be characterized as including: generating a beam of laser energy; directing the beam of laser energy along a beam path that intersects a scan lens; propagating the beam of laser energy through the scan lens; deflecting the beam path within a first region of the scan lens to process a first workpiece with the beam of laser energy propagated through the scan lens; and after deflecting the beam path within the first region of the scan lens, deflecting the beam path within a second region of the scan lens to process the first workpiece with the beam of laser energy propagated through the scan lens.

In another embodiment, a method can be characterized as including: generating a beam of laser energy; directing the beam of laser energy along a beam path that intersects a scan lens; propagating the beam of laser energy through the scan lens; deflecting the beam path within a scan region of the scan lens to process a first workpiece with the beam of laser energy propagated through the scan lens, wherein the scan region occupies a first region of the scan lens; and after deflecting the beam path within the first region of the scan lens, shifting the scan region along a shift direction such that the scan region occupies a second region of the scan lens and deflecting the beam path within the second region of the scan lens to process the first workpiece with the beam of laser energy propagated through the scan lens.

In another embodiment, an apparatus can be characterized as including: a laser source configured to generate a beam of laser energy, the beam of laser energy can be propagated along a beam path; a scan lens arranged within the beam path; at least one positioner arranged within the beam path and configured to deflect the beam path relative to the scan lens; optionally, at least one positioner configured to support a workpiece and move the workpiece relative to the scan lens; and a controller communicatively coupled to the at least one positioner. The controller can be characterized as including: a processor configured to generate one or more control signals to which the at least one positioner is responsive; and computer memory accessible by the processor, wherein the computer memory has instructions stored thereon which, when executed by the processor to cause the apparatus to perform the method as exemplarily described in the paragraphs above.

DETAILED DESCRIPTION

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The section headings used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

I. Overview

Embodiments described herein relate generally to methods and apparatuses for laser-processing (or, more simply, "processing") a workpiece. Generally the processing is accomplished, either in whole or in part, by irradiating the workpiece with laser radiation, to heat, melt, evaporate, ablate, crack, discolor, polish, roughen, carbonize, foam, or otherwise modify one or more properties or characteristics of one or more materials from which the workpiece is formed (e.g., in terms of chemical composition, atomic structure, ionic structure, molecular structure, electronic structure, microstructure, nanostructure, density, viscosity, index of refraction, magnetic permeability, relative permittivity, texture, color, hardness, transmissivity to electromagnetic radiation, or the like or any combination thereof). Materials to be processed may be present at an exterior of the workpiece prior to or during processing, or may be located completely within the workpiece (i.e., not present at an exterior of the workpiece) prior to or during processing.

Specific examples of processes that may be carried by the disclosed apparatus for laser processing include via drilling or other hole formation, cutting, perforating, welding, scribing, engraving, marking (e.g., surface marking, sub-surface marking, etc.), laser-induced forward transfer, cleaning, bleaching, bright pixel repair (e.g., color filter darkening, modification of OLED material, etc.), decoating, surface texturing (e.g., roughening, smoothing, etc.), or the like or any combination thereof. Thus, one or more features on that may be formed on or within a workpiece, as a result of the processing, can include openings, slots, vias or other holes, grooves, trenches, scribe lines, kerfs, recessed regions, conductive traces, ohmic contacts, resist patterns, human- or machine-readable indicia (e.g., comprised of one or more regions in or on the workpiece having one or more visually or texturally distinguishing characteristics), or the like or any combination thereof. Features such as openings, slots, vias, holes, etc., can have any suitable or desirable shape (e.g., circular, elliptical, square, rectangular, triangular, annular, or the like or any combination thereof) when viewed from a top plan view. Further, features such as openings, slots, vias, holes, etc., can extend completely through the workpiece (e.g., so as to form so-called "through vias," "through holes," etc.) or only partially through the workpiece (e.g., so as to form so-called "blind vias," "blind holes," etc.).

Workpieces that may be processed can be generically characterized being formed of one or more metals, polymers, ceramics, composites, or any combination thereof (e.g., whether as an alloy, compound, mixture, solution, composite, etc.). Specific examples of workpieces that may be processed include, panels of printed circuit boards (PCBs) (also referred to herein as "PCB panels"), PCBs, flexible printed circuits (FPCs), integrated circuits (ICs), IC packages (ICPs), light-emitting diodes (LEDs), LED packages, semiconductor wafers, electronic or optical device substrates (e.g., substrates formed of $Al_2O_3$, AN, BeO, Cu, GaAS, GaN, Ge, InP, Si, $SiO_2$, SiC, $Si_{1-x}Ge_x$ (where $0.0001<x<0.9999$), or the like, or any combination or alloy thereof), lead frames, lead frame blanks, articles formed of plastic, unstrengthened glass, thermally-strengthened glass, chemically-strengthened glass (e.g., via an ion-exchange process), quartz, sapphire, plastic, silicon, etc., components of electronic displays (e.g., substrates having formed thereon, TFTs, color filters, organic LED (OLED) arrays, quantum dot LED arrays, or the like or any combination thereof), lenses, mirrors, screen protectors, turbine blades, powders, films, foils, plates, molds (e.g., wax molds, molds for injection-molding processes, investment-casting processes, etc.), fabrics (woven, felted, etc.), surgical instruments, medical implants, consumer packaged goods, shoes, bicycles, automobiles, automotive or aerospace parts (e.g., frames, body panels, etc.), appliances (e.g., microwaves, ovens, refrigerators, etc.), device housings (e.g., for watches, computers, smartphones, tablet computers, wearable electronic devices, or the like or any combination thereof).

Accordingly, materials that may be processed include one or more metals such as Al, Ag, Au, Cu, Fe, In, Mg, Pt, Sn, Ti, or the like, or any combination thereof (e.g., whether as an alloy, composite, etc.), conductive metal oxides (e.g., ITO, etc.), transparent conductive polymers, ceramics, waxes, resins, inorganic dielectric materials (e.g., used as interlayer dielectric structures, such as silicon oxide, silicon nitride, silicon oxynitride, or the like or any combination thereof), low-k dielectric materials (e.g., methyl silsesquioxane (MSQ), hydrogen silsesquioxane (HSQ), fluorinated tetraethyl orthosilicate (FTEOS), or the like or any combination thereof), organic dielectric materials (e.g., SILK, benzocyclobutene, Nautilus, (all manufactured by Dow), polyfluorotetraethylene, (manufactured by DuPont), FLARE, (manufactured by Allied Chemical), or the like or any combination thereof), glass fibers, polymeric materials (polyamides, polyimides, polyesters, polyacetals, polycarbonates, modified polyphenylene ethers, polybutylene terephthalates, polyphenylene sulfides, polyether sulfones, polyether imides, polyether ether ketones, liquid crystal polymers, acrylonitrile butadiene styrene, and any compound, composite, or alloy thereof), leather, paper, build-up materials (e.g., AJINOMOTO Build-up Film, also known as "ABF", etc.), glass-reinforced epoxy laminate (e.g., FR4), prepregs, solder resist, or the like or any composite, laminate, or other combination thereof.

II. System—Overview

FIG. 1 schematically illustrates an apparatus for processing a workpiece, in accordance with one embodiment of the present invention.

Referring to the embodiment shown in FIG. 1, an apparatus 100 for processing a workpiece includes a laser source 104 for generating laser pulses, a first positioner 106, a second positioner 108, a third positioner 110, a scan lens 112 and a controller 114.

In view of the description that follows, it should be recognized that inclusion of the first positioner 106 is optional (i.e., the apparatus 100 need not include the first positioner 106), provided that the apparatus 100 includes the second positioner 108, the third positioner 110, or a combination thereof. Likewise, it should be recognized that inclusion of the second positioner 108 is optional (i.e., the apparatus 100 need not include the second positioner 108), provided that the apparatus 100 includes the first positioner 106, the third positioner 110, or a combination thereof. Lastly, it should similarly be recognized that inclusion of the third positioner 110 is optional (i.e., the apparatus 100 need not include the third positioner 110), provided that the apparatus 100 includes the first positioner 106, the second positioner 108, or a combination thereof.

Although not illustrated, the apparatus 100 also includes one or more optical components (e.g., beam expanders, beam shapers, apertures, filters, collimators, lenses, mirrors, polarizers, wave plates, diffractive optical elements, refractive optical elements, or the like or any combination thereof) to focus, expand, collimate, shape, polarize, filter, split, combine, crop, or otherwise modify, condition, direct, monitor or measure laser pulses generated by the laser source 104 along one or more beam paths (e.g., beam path 116) to the scan lens 112. It will further be appreciated that one or more of the aforementioned components may be provided, or that the apparatus 100 may further include one or more additional components, as disclosed in U.S. Pat. Nos. 4,912,487, 5,633,747, 5,638,267, 5,751,585, 5,847,960, 5,917,300, 6,314,473, 6,430,465, 6,700,600, 6,706,998, 6,706,999, 6,816,294, 6,947,454, 7,019,891, 7,027,199, 7,133,182, 7,133,186, 7,133,187, 7,133,188, 7,245,412, 7,259,354, 7,611,745, 7,834,293, 8,026,158, 8,076,605, 8,158,493, 8,288,679, 8,404,998, 8,497,450, 8,648,277, 8,680,430, 8,847,113, 8,896,909, 8,928,853, 9,259,802 or in aforementioned U.S. Patent App. Pub. Nos. 2014/0026351, 2014/0197140, 2014/0263201, 2014/0263212, 2014/0263223, 2014/0312013, or in German Patent No. DE102013201968B4, or in International Patent App. Pub. No. WO2009/087392, or any combination thereof, each of which is incorporated herein by reference in its entirety.

Laser pulses transmitted through the scan lens 112 propagate along a beam axis so as to be delivered to the workpiece 102. Laser pulses delivered to the workpiece 102 may be characterized as having a Gaussian-type spatial intensity profile or a non-Gaussian-type (i.e., "shaped") spatial intensity profile (e.g., a "top-hat" spatial intensity profile). Regardless of the type of spatial intensity profile, the spatial intensity profile can also be characterized as a shape (i.e., a cross-sectional shape) of a laser pulse propagating along the beam axis (or beam path 116), which may be circular, elliptical, square, rectangular, triangular, hexagonal, ring-shaped, etc., or arbitrarily shaped. As used herein, the term "spot size" refers to the diameter or maximum spatial width of a delivered laser pulse at a location where the beam axis traverses a region of the workpiece 102 (also referred to as a "process spot," "spot location" or, more simply, a "spot") that is to be, at least partially, processed by the delivered laser pulse. For purposes of discussion herein, spot size is measured as a radial or transverse distance from the beam axis to where the optical intensity drops to, at least, $1/e^2$ of the optical intensity at the beam axis. Generally, the spot size of a laser pulse will be at a minimum at the beam waist.

Delivered laser pulses can be characterized as impinging the workpiece 102 at a spot size in a range from 2 μm to 200 μm. It will be appreciated, however, that the spot size can be made smaller than 2 μm or larger than 200 μm. Thus, at least one laser pulse delivered to the workpiece 102 can have a spot size greater than, less than, or equal to 2 μm, 3 μm, 5 μm, 7 μm, 10 μm, 15 μm, 30 μm, 35 μm, 40 μm, 45 μm, 50 μm, 55 μm, 80 μm, 100 μm, 150 μm, 200 μm, etc., or between any of these values. In one embodiment, laser pulses delivered to the workpiece 102 can have a spot size in a range from 25 μm to 60 μm. In another embodiment, laser pulses delivered to the workpiece 102 can have a spot size in a range from 35 μm to 50 μm.

A. Laser Source

Generally, the laser source 104 is operative to generate laser pulses. As such, the laser source 104 may include a pulse laser source, a CW laser source, a QCW laser source, a burst mode laser, or the like or any combination thereof. In the event that the laser source 104 includes a QCW or CW laser source, the laser source 104 may further include a pulse gating unit (e.g., an acousto-optic (AO) modulator (AOM), a beam chopper, etc.) to temporally modulate beam of laser radiation output from the QCW or CW laser source. Although not illustrated, the apparatus 100 may optionally include one or more harmonic generation crystals (also known as "wavelength conversion crystals") configured to convert a wavelength of light output by the laser source 104. In another embodiment, the laser source 104 may be provided as a QCW laser source or a CW laser source and not include a pulse gating unit. Accordingly, laser energy (whether provided as a series of laser pulses, or as a CW beam, etc.) that is ultimately delivered to the workpiece 102 may be characterized as having one or more wavelengths in one or more of the ultra-violet (UV), visible (e.g., violet, blue, green, red, etc.), or infrared (IR) ranges of the electromagnetic spectrum, or any combination thereof. Laser light in the UV range of the electromagnetic spectrum may have one or more wavelengths in a range from 10 nm (or thereabout) to 385 nm (or thereabout), such as 10 nm, 121 nm, 124 nm, 157 nm, 200 nm, 334 nm, 337 nm, 351 nm, 380 nm, etc., or between any of these values. Laser light in the visible, green range of the electromagnetic spectrum may have one or more wavelengths in a range from 500 nm (or thereabout) to 570 nm (or thereabout), such as 511 nm, 515 nm, 530 nm, 532 nm, 543 nm, 568 nm, etc., or between any of these values. Laser light in the IR range of the electromagnetic spectrum may have one or more wavelengths in a range from 750 nm (or thereabout) to 15 µm (or thereabout), such as 700 nm to 1000 nm, 752.5 nm, 780 nm to 1060 nm, 799.3 nm, 980 nm, 1047 nm, 1053 nm, 1060 nm, 1064 nm, 1080 nm, 1090 nm, 1152 nm, 1150 nm to 1350 nm, 1540 nm, 2.6 µm to 4 µm, 4.8 µm to 8.3 µm, 9.4 µm, 10.6 µm, etc., or between any of these values.

Laser pulses output by the laser source 104 can have a pulse width or pulse duration (i.e., based on the full-width at half-maximum (FWHM) of the optical power in the pulse versus time) that is in a range from 10 fs to 900 ms. It will be appreciated, however, that the pulse duration can be made smaller than 10 fs or larger than 900 ms. Thus, at least one laser pulse output by the laser source 104 can have a pulse duration less than, greater than or equal to 10 fs, 15 fs, 30 fs, 50 fs, 100 fs, 150 fs, 200 fs, 300 fs, 500 fs, 700 fs, 750 fs, 800 fs, 850 fs, 900 fs, 950 fs, 1 ps, 2 ps, 3 ps, 4 ps, 5 ps, 7 ps, 10 ps, 15 ps, 25 ps, 50 ps, 75 ps, 100 ps, 200 ps, 500 ps, 1 ns, 1.5 ns, 2 ns, 5 ns, 10 ns, 20 ns, 50 ns, 100 ns, 200 ns, 400 ns, 800 ns, 1000 ns, 2 µs, 5 µs, 10 µs, 50 µs, 100 µs, 300 µs, 500 µs, 900 µs, 1 ms, 2 ms, 5 ms, 10 ms, 20 ms, 50 ms, 100 ms, 300 ms, 500 ms, 900 ms, 1 s, etc., or between any of these values.

Laser pulses output by the laser source 104 can have an average power in a range from 5 mW to 50 kW. It will be appreciated, however, that the average power can be made smaller than 5 mW or larger than 50 kW. Thus, laser pulses output by the laser source 104 can have an average power less than, greater than or equal to 5 mW, 10 mW, 15 mW, 20 mW, 25 mW, 50 mW, 75 mW, 100 mW, 300 mW, 500 mW, 800 mW, 1 W, 2 W, 3 W, 4 W, 5 W, 6 W, 7 W, 10 W, 15 W, 18 W, 25 W, 30 W, 50 W, 60 W, 100 W, 150 W, 200 W, 250 W, 500 W, 2 kW, 3 kW, 20 kW, 50 kW, etc., or between any of these values.

Laser pulses can be output by the laser source 104 at a pulse repetition rate in a range from 5 kHz to 1 GHz. It will be appreciated, however, that the pulse repetition rate can be less than 5 kHz or larger than 1 GHz. Thus, laser pulses can be output by the laser source 104 at a pulse repetition rate less than, greater than or equal to 5 kHz, 50 kHz, 100 kHz, 175 kHz, 225 kHz, 250 kHz, 275 kHz, 500 kHz, 800 kHz, 900 kHz, 1 MHz, 1.5 MHz, 1.8 MHz, 1.9 MHz, 2 MHz, 2.5 MHz, 3 MHz, 4 MHz, 5 MHz, 10 MHz, 20 MHz, 50 MHz, 70 MHz, 100 MHz, 150 MHz, 200 MHz, 250 MHz, 300 MHz, 350 MHz, 500 MHz, 550 MHz, 700 MHz, 900 MHz, 2 GHz, 10 GHz, etc., or between any of these values.

In addition to wavelength, pulse duration, average power and pulse repetition rate, laser pulses delivered to the workpiece 102 can be characterized by one or more other characteristics such as pulse energy, peak power, etc., which can be selected (e.g., optionally based on one or more other characteristics such as wavelength, pulse duration, average power and pulse repetition rate, etc.) to irradiate the workpiece 102 at the process spot at an optical intensity (measured in $W/cm^2$), fluence (measured in $J/cm^2$), etc., sufficient to process the workpiece 102 (e.g., to form one or more features having one or more desired characteristics).

Examples of types of lasers that the laser source 104 may be characterized as gas lasers (e.g., carbon dioxide lasers, carbon monoxide lasers, excimer lasers, etc.), solid-state lasers (e.g., Nd:YAG lasers, etc.), rod lasers, fiber lasers, photonic crystal rod/fiber lasers, passively mode-locked solid-state bulk or fiber lasers, dye lasers, mode-locked diode lasers, pulsed lasers (e.g., ms-, ns-, ps-, fs-pulsed lasers), CW lasers, QCW lasers, or the like or any combination thereof. Depending upon their configuration, gas lasers (e.g., carbon dioxide lasers, etc.) may be configured to operate in one or more modes (e.g., in CW mode, QCW mode, pulsed mode, or any combination thereof). Specific examples of laser sources that may be provided as the laser source 104 include one or more laser sources such as: the BOREAS, HEGOA, SIROCCO or CHINOOK series of lasers manufactured by EOLITE; the PYROFLEX series of lasers manufactured by PYROPHOTONICS; the PALADIN Advanced 355 or DIAMOND series (e.g., DIAMOND E-, G-, J-2, J-3, J-5 series) of lasers manufactured by COHERENT; the PULSTAR- or FIRESTAR-series lasers manufactured by SYNRAD; the TRUFLOW-series of lasers (e.g., TRUFLOW 2000, 2700, 3000, 3200, 3600, 4000, 5000, 6000, 7000, 8000, 10000, 12000, 15000, 20000), TRUCOAX-series of lasers (e.g., TRUCOAX 1000) or the TRUDISK-, TRUPULSE-, TRUDIODE-, TRUFIBER-, or TRUMICRO-series of lasers, all manufactured by TRUMPF; the FCPA µJEWEL or FEMTOLITE series of lasers manufactured by IMRA AMERICA; the TANGERINE and SATSUMA series lasers (and MIKAN and T-PULSE series oscillators) manufactured by AMPLITUDE SYSTEMES; CL-, CLPF-, CLPN-, CLPNT-, CLT-, ELM-, ELPF-, ELPN-, ELPP-, ELR-, ELS-, FLPN-, FLPNT-, FLT-, GLPF-, GLPN-, GLR-, HLPN-, HLPP-, RFL-, TLM-, TLPN-, TLR-, ULPN-, ULR-, VLM-, VLPN-, YLM-, YLPF-, YLPN-, YLPP-, YLR-, YLS-, FLPM-, FLPMT-, DLM-, BLM-, or DLR-series of lasers manufactured by IPG PHOTONICS (e.g., including the GPLN-100-M, GPLN-500-QCW, GPLN-500-M, GPLN-500-R, GPLN-2000-S, etc.), or the like or any combination thereof.

B. First Positioner

The first positioner 106 is arranged, located or otherwise disposed in the beam path 116 and is operative to diffract, reflect, refract, or the like, or any combination thereof, laser pulses that are generated by the laser source 104 (i.e., to "deflect" the laser pulses) so as to impart movement of the beam path 116 (e.g., relative to the scan lens 112) and, consequently, impart movement of the beam axis relative to the workpiece 102. Generally, the first positioner 106 is configured to impart movement of the beam axis relative to the workpiece 102 along X- and Y-axes (or directions). Although not illustrated, the X-axis (or X-direction) will be understood to refer to an axis (or direction) that is orthogonal to the illustrated Y- and Z-axes (or directions).

Movement of the beam axis relative to the workpiece 102, as imparted by the first positioner 106, is generally limited such that the process spot can be scanned, moved or otherwise positioned within a first scan field or "first scanning range" that extends between 0.01 mm to 4.0 mm in the X- and Y-directions. It will be appreciated, however, that the first scanning range may extend less than 0.01 mm or more than 4.0 mm in any of the X- or Y-directions (e.g., depending upon one or more factors such as the configuration of the first positioner 106, the location of the first positioner 106 along the beam path 116, the beam size of the laser pulses incident upon the first positioner 106, the spot size, etc.). Thus, the first scanning range may extend, in any of the X- and Y-directions a distance that is less than, greater than or equal to 0.01 mm, 0.04 mm, 0.1 mm, 0.5 mm, 1.0 mm, 1.4 mm, 1.5 mm, 1.8 mm, 2 mm, 2.5 mm, 3.0 mm, 3.5 mm, 4.0 mm, 4.2 mm, 5 mm, 10 mm, 25 mm, 50 mm, 70 mm, etc., or between any of these values. As used herein, the term "beam size" refers to the diameter or width of a laser pulse, and can be measured as a radial or transverse distance from the beam axis to where the optical intensity drops to $1/e^2$ of the optical intensity at the axis of propagation along the beam path 116. Thus in some embodiments, a maximum dimension of the first scanning range (e.g., in the X- or Y-directions, or otherwise) may be greater than or equal to a corresponding maximum dimension (as measured in the X-Y plane) of a feature (e.g., an opening, a recess, a via, a trench, etc.) to be formed in the workpiece 102. In another embodiment however, the maximum dimension of the first scanning range may be less than the maximum dimension of the feature to be formed.

Generally, the rate (also referred to as a "positioning rate") with which the first positioner 106 is capable of positioning the process spot at any location within the first scanning range (thus moving the beam axis) is in a range from 50 kHz (or thereabout) to 250 MHz (or thereabout). This range is also referred to herein as the first positioning bandwidth. It will be appreciated, however, that the first positioning bandwidth can be less than 50 kHz or greater than 250 MHz. The inverse of the positioning rate is herein referred to as the "positioning period," and refers to the minimum amount of time necessary to change the position the process spot from one location within the first scanning range to any other location within the first scanning range. Thus, the first positioner 106 can be characterized by a positioning period in a range from 20 µs (or thereabout) to 0.004 µs (or thereabout). In one embodiment, the first positioning bandwidth is in a range from 100 kHz (or thereabout) to 10 MHz (or thereabout). For example, the first positioning bandwidth of 2 MHz (or thereabout), 1 MHz (or thereabout), etc.

The first positioner 106 can be provided as a micro-electro-mechanical-system (MEMS) mirror or mirror array, an acousto-optic (AO) deflector (AOD) system, an electro-optic deflector (EOD) system, a fast-steering mirror (FSM) element incorporating a piezoelectric actuator, electrostrictive actuator, voice-coil actuator, galvanometer mirror system, rotating polygon scanner, etc., or the like or any combination thereof. In one embodiment, the first positioner 106 is provided as an AOD system including at least one (e.g., one, two, etc.) single-element AOD system, at least one (e.g., one, two, etc.) phased-array AOD system, or the like or any combination thereof. Both AOD systems include an AO cell formed of a material such as crystalline Ge, $PbMoO_4$, or $TeO_2$, glassy $SiO_2$, quartz, $As_2S_3$, etc. As used herein, a "single-element" AOD system refers to an AOD system having only a single ultrasonic transducer element acoustically coupled to the AO cell, whereas a "phased-array" AOD system includes a phased-array of at least two ultrasonic transducer elements acoustically coupled to a common AO cell.

As will be recognized by those of ordinary skill, AO technologies (e.g., AODs, AOMs, etc.) utilize diffraction effects caused by acoustic waves propagating through the AO cell to modulate one or more characteristics of an optical wave (i.e., a beam of laser energy, in the context of the present application) contemporaneously propagating through the AO cell. Typically the AO cell is capable of supporting both the acoustic wave and the optical wave in the same region. The acoustic wave imparts a perturbation to the index of refraction in the AO cell. Acoustic waves are typically launched into the AO cell by driving the ultrasonic transducer element at one or more RF frequencies. By controlling characteristics of the acoustic wave (e.g., amplitude, frequency, phase, etc.) one or more characteristics of the propagating optic wave may be controllably modulated to impart movement of the beam path 116 (e.g., relative to the scan lens 112). It should also be recognized that characteristics of an acoustic wave launched into an AO cell can be controlled using well-known techniques to attenuate the energy in a beam of laser energy as it transits the AO cell. Accordingly, an AOD system can also be operated to modulate the pulse energy (and, correspondingly, the fluence, peak power, optical intensity, average power, etc.) of laser pulses ultimately delivered to the workpiece 102.

Any of the AOD systems may be provided as single-axis AOD system (e.g., configured impart movement of the beam axis along a single direction) or as a multi-axis AOD system (e.g., configured impart movement of the beam axis along a multiple directions, e.g., X- and Y-directions) by deflecting the beam path 116. Generally, a multi-axis AOD system can be provided as a multi-cell system or a single-cell system. A multi-cell, multi-axis system typically includes multiple AOD systems, each configured to impart movement of the beam axis along a different axis. For example, a multi-cell, multi-axis system can include a first AOD system (e.g., a single-element or phased-array AOD system) configured to impart movement of the beam axis along the X-direction (e.g., an "X-axis AOD system"), and a second AOD system (e.g., a single-element or phased-array AOD system) configured to impart movement of the beam axis along the Y-direction (e.g., a "Y-axis AOD system"). A single-cell, multi-axis system (e.g., an "X/Y-axis AOD system") typically includes a single AOD system configured to impart movement of the beam axis along the X- and Y-directions. For example, a single-cell system can include at least two ultrasonic transducer elements acoustically coupled to different planes, facets, sides, etc., of a common AO cell.

C. Second Positioner

Like the first positioner 106, the second positioner 108 is disposed in the beam path 116 and is operative to diffract, reflect, refract, or the like or any combination thereof, laser pulses that are generated by the laser source 104 and passed by the first positioner 106 so as to impart movement of the beam axis (e.g., along the X-direction, the Y-direction, or any combination thereof) relative to the workpiece 102, via movement of the beam path 116 relative to the scan lens 112. Movement of the beam axis relative to the workpiece 102, as imparted by the second positioner 108, is generally limited such that the process spot can be scanned, moved or otherwise positioned within a second scan field or "scanning range" that extends in the X- and/or Y-directions over an area that is greater than the first scanning range. In view of the configuration described herein, it should be recognized that movement of the beam axis imparted by the first positioner 106 can be superimposed by movement of the beam axis imparted by the second positioner 108. Thus, the second positioner 108 is operative to scan the first scanning range within the second scanning range.

In one embodiment, the second scanning range extends between 1 mm to 1.5 m in the X- and/or Y-directions. In another embodiment, the second scanning range extends between 15 mm to 50 mm in the X- and/or Y-directions. It will be appreciated, however, that the second positioner 108 may be configured such that the second scanning range extends less than 1 mm or more than 1.5 m in any of the X- or Y-directions. Thus in some embodiments, a maximum dimension of the second scanning range (e.g., in the X- or Y-directions, or otherwise) may be greater than or equal to a corresponding maximum dimension (as measured in the X-Y plane) of a feature (e.g., a via, a trench, a scribe line, a recessed region, a conductive trace, etc.) to be formed in the workpiece 102. In another embodiment however, the maximum dimension of the second scanning range may be less than the maximum dimension of the feature to be formed.

Generally, the positioning rate with which the second positioner 108 is capable of positioning the process spot at any location within the second scanning range (thus moving the beam axis within the second scanning range and/or scanning the first scanning range within the second scanning range) spans a range (also referred to herein as the "second positioning bandwidth") that is less than the first positioning bandwidth. In one embodiment, the second positioning bandwidth is in a range from 900 Hz to 5 kHz. In another embodiment, the first positioning bandwidth is in a range from 2 kHz to 3 kHz (e.g., about 2.5 kHz).

The second positioner 108 can be provided as a galvanometer mirror system including two galvanometer mirror components, where one galvanometer mirror component (e.g., an X-axis galvanometer mirror component) is arranged to impart movement of the beam axis relative to the workpiece 102 along the X-direction and another galvanometer mirror component (e.g., a Y-axis galvanometer mirror component) is arranged to impart movement of the beam axis relative to the workpiece 102 along the Y-direction. In another embodiment, however, the second positioner 108 may be provided as a galvanometer mirror system including a single galvanometer mirror component arranged to impart movement of the beam axis relative to the workpiece 102 along the X- and Y-directions. In yet other embodiments, the second positioner 108 may be provided as a rotating polygon mirror system, etc. It will thus be appreciated that, depending on the specific configuration of the second positioner 108 and the first positioner 106, the second positioning bandwidth may be greater than or equal to the first positioning bandwidth.

D. Third Positioner

The third positioner 110 is operative to impart movement of the workpiece 102 relative to the scan lens 112, and, consequently, movement of the workpiece 102 relative to the beam axis. Movement of the workpiece 102 relative to the beam axis is generally limited such that the process spot can be scanned, moved or otherwise positioned within a third scan field or "scanning range" that extends in the X- and/or Y-directions over an area that is greater than the second scanning range. In one embodiment, the third scanning range extends between 25 mm to 2 m in the X- and/or Y-directions. In another embodiment, the third scanning range extends between 0.5 m to 1.5 m in the X- and/or Y-directions. Generally, a maximum dimension of the third scanning range (e.g., in the X- or Y-directions, or otherwise) will be greater than or equal to a corresponding maximum dimension (as measured in the X-Y plane) of any feature to be formed in the workpiece 102. Optionally, the third positioner 110 may be configured to move the workpiece 102 relative to the beam axis within a scanning range that extends in the Z-direction (e.g., over a range between 1 mm and 50 mm). Thus, the third scanning range may extend along the X-, Y- and/or Z-directions.

In view of the configuration described herein, it should be recognized that movement of the beam axis imparted by the first positioner 106 and/or the second positioner 108 can be superimposed by movement of the workpiece 102 imparted by the third positioner 110. Thus, the third positioner 110 is operative to scan the first scanning range and/or second scanning range within the third scanning range. Generally, the positioning rate with which the third positioner 110 is capable of positioning the process spot at any location within the third scanning range (thus moving the workpiece 102, scanning the first scanning range within the third scanning range, and/or scanning the second scanning range within the third scanning range) spans a range (also referred to herein as the "third positioning bandwidth") that is less than the second positioning bandwidth. In one embodiment, the third positioning bandwidth is in a range of 10 Hz (or thereabout), or less.

In one embodiment, the third positioner 110 is provided as one or more linear stages (e.g., each capable of imparting translational movement to the workpiece 102 along the X-, Y- and/or Z-directions), one or more rotational stages (e.g., each capable of imparting rotational movement to the workpiece 102 about an axis parallel to the X-, Y- and/or Z-directions), or the like or any combination thereof. In one embodiment, the third positioner 110 includes an X-stage for moving the workpiece 102 along the X-direction, and a Y-stage supported by the X-stage (and, thus, moveable along the X-direction by the X-stage) for moving the workpiece 102 along the Y-direction. Although not shown, the apparatus 100 may also include an optional base (e.g., a granite block) that supports the third positioner 110.

Although not shown, the apparatus 100 may include an optional chuck coupled to the third positioner 110, to which the workpiece 102 can be mechanically clamped, fixed, held, secured or be otherwise supported. In one embodiment, the workpiece 102 can be clamped, fixed, held, secured or be otherwise supported so as to directly contact a main, typically flat, support surface of the chuck. In another embodiment, the workpiece 102 can be clamped, fixed, held, secured or be otherwise supported so as to be spaced apart from the support surface of the chuck. In another embodiment, the workpiece 102 can be fixed, held, or secured by way of a force (e.g., an electrostatic force, a vacuum force, a magnetic force) applied to the workpiece 102 from the chuck, or otherwise present between the workpiece 102 and the chuck.

As described thus far, the apparatus 100 employs a so-called "stacked" positioning system, in which positions of the components such as the first positioner 106, second positioner 108, scan lens 112, etc., are kept stationary within the apparatus 100 (e.g., via one or more supports, frames, etc., as is known in the art) relative to the workpiece 102, which is moved via the third positioner 110. In another embodiment, the third positioner 110 may be arranged and configured to move one or more components such as the first positioner 106, second positioner 108, scan lens 112, etc., and the workpiece 102 may be kept stationary.

In yet another embodiment, the apparatus 100 can employ a split-axis positioning system in which one or more components such as the first positioner 106, second positioner 108, scan lens 112, etc., are carried by one or more linear or rotational stages and the workpiece 102 is carried by one or more other linear or rotational stages. In such an embodiment, the third positioner 110 includes one or more linear or rotational stages arranged and configured to move one or more components such as the first positioner 106, second positioner 108, scan lens 112, etc., (e.g., in the X-direction) and one or more linear or rotational stages arranged and configured to move the workpiece 102 (e.g., in the Y-direction). Thus, the third positioner 110 may, for example, impart movement of the workpiece 102 (e.g., along the Y-direction) and impart movement of the second positioner 108 and scan lens 112. Some examples of split-axis positioning systems that may be beneficially or advantageously employed in the apparatus 100 include any of those disclosed in U.S. Pat. Nos. 5,751,585, 5,798,927, 5,847,960, 6,706,999, 7,605,343, 8,680,430, 8,847,113, or in U.S. Patent App. Pub. No. 2014/0083983, or any combination thereof, each of which is incorporated herein by reference in its entirety.

In another embodiment, one or more components such as the first positioner 106, second positioner 108, scan lens 112, etc., may be carried by an articulated, multi-axis robotic arm (e.g., a 2-, 3-, 4-, 5-, or 6-axis arm). In such an embodiment, the second positioner 108 and/or scan lens 112 may, optionally, be carried by an end effector of the robotic arm. In yet another embodiment, the workpiece 102 may be carried directly on an end effector of an articulated, multi-axis robotic arm (i.e., without the third positioner 110). In still another embodiment, the third positioner 110 may be carried on an end effector of an articulated, multi-axis robotic arm.

D. Scan Lens

The scan lens 112 (e.g., provided as either a simple lens, or a compound lens) is generally configured to focus laser pulses directed along the beam path, typically so as to produce a beam waist that can be positioned at or near the desired process spot. The scan lens 112 may be provided as an f-theta lens, a telecentric lens, an axicon lens (in which case, a series of beam waists are produced, yielding a plurality of process spots displaced from one another along the beam axis), or the like or any combination thereof. In one embodiment, the scan lens 112 is provided as a fixed-focal length lens and is coupled to a lens actuator (not shown) configured to move the scan lens 112 (e.g., so as to change the position of the beam waist along the beam axis). For example, the lens actuator may be provided as a voice coil configured to linearly translate the scan lens 112 along the Z-direction. In this case, the scan lens 112 may be formed of a material such as fused silica, optical glass, zinc selenide, zinc sulfide, germanium, gallium arsenide, magnesium fluoride, etc. In another embodiment, the scan lens 112 is provided as a variable-focal length lens (e.g., a zoom lens, or a so-called "liquid lens" incorporating technologies currently offered by COGNEX, VARIOPTIC, etc.) capable of being actuated (e.g., via a lens actuator) to change the position of the beam waist along the beam axis.

In one embodiment, the scan lens 112 and the second positioner 108 are integrated into a common housing or "scan head." Thus, in an embodiment in which the apparatus 100 includes a lens actuator, the lens actuator may be coupled to the scan lens 112 (e.g., so as to enable movement of the scan lens 112 within the scan head, relative to the second positioner 108). Alternatively, the lens actuator may be coupled to the scan head (e.g., so as to enable movement of the scan head itself, in which case the scan lens 112 and the second positioner 108 would move together). In another embodiment, the scan lens 112 and the second positioner 108 are integrated into different housings (e.g., such that the housing in which the scan lens 112 is integrated is movable relative to the housing in which the second positioner 108 is integrated). Components of the scan head, or the entire scan head itself, may be of a modular assembly, such that a component of the scan head can be simply removed and replaced with another component, such that one scan head can be simply removed and replaced with another scan head, etc.

E. Controller

Generally, the controller 114 is communicatively coupled (e.g., over one or more wired or wireless, serial or parallel, communications links, such as USB, RS-232, Ethernet, Firewire, Wi-Fi, RFID, NFC, Bluetooth, Li-Fi, SERCOS, MARCO, EtherCAT, or the like or any combination thereof) to one or more components of the apparatus 100, such as the laser source 104, the first positioner 106, the second positioner 108, third positioner 110, the lens actuator, etc., which are thus operative in response to one or more control signals output by the controller 114. Some examples of operations that one or more of the aforementioned components can be controlled to perform include any operations, functions, processes, and methods, etc., as disclosed in aforementioned U.S. Pat. Nos. 4,912,487, 5,633,747, 5,638,267, 5,751,585, 5,847,960, 5,917,300, 6,314,473, 6,430,465, 6,700,600, 6,706,998, 6,706,999, 6,816,294, 6,947,454, 7,019,891, 7,027,199, 7,133,182, 7,133,186, 7,133,187, 7,133,188, 7,245,412, 7,259,354, 7,611,745, 7,834,293, 8,026,158, 8,076,605, 8,288,679, 8,404,998, 8,497,450, 8,648,277, 8,680,430, 8,847,113, 8,896,909, 8,928,853, 9,259,802, or in aforementioned U.S. Patent App. Pub. Nos. 2014/0026351, 2014/0197140, 2014/0263201, 2014/0263212, 2014/0263223, 2014/0312013, or in German Patent No. DE102013201968B4, or in International Patent App. No. WO2009/087392, or any combination thereof.

Generally, the controller 114 includes one or more processors configured to generate the aforementioned control signals upon executing instructions. A processor can be provided as a programmable processor (e.g., including one or more general purpose computer processors, microprocessors, digital signal processors, or the like or any combination thereof) configured to execute the instructions. Instructions executable by the processor(s) may be implemented software, firmware, etc., or in any suitable form of circuitry including programmable logic devices (PLDs), field-programmable gate arrays (FPGAs), field-programmable object arrays (FPGAs), application-specific integrated circuits (ASICs)—including digital, analog and mixed analog/digital circuitry—or the like, or any combination thereof. Execution of instructions can be performed on one processor, distributed among processors, made parallel across processors within a device or across a network of devices, or the like or any combination thereof.

In one embodiment, the controller 114 includes tangible media such as computer memory, which is accessible (e.g., via one or more wired or wireless communications links) by the processor. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or a combination thereof. Generally, the instructions may be stored as computer software (e.g., executable code, files, instructions, etc., library files, etc.), which can be readily authored by artisans, from the descriptions provided herein, e.g., written in C, C++, Visual Basic, Java, Python, Tcl, Perl, Scheme, Ruby, assembly language, hardware description language (e.g., VHDL, VERILOG, etc.), etc. Computer software is commonly stored in one or more data structures conveyed by computer memory.

Although not shown, one or more drivers (e.g., RF drivers, servo drivers, line drivers, power sources, etc.) can be communicatively coupled to an input of one or more components such as the laser source 104, the first positioner 106, the second positioner 108, the third positioner 110, the lens actuator, etc. In one embodiment, each driver typically includes an input to which the controller 114 is communicatively coupled and the controller 114 is thus operative to generate one or more control signals (e.g., trigger signals, etc.), which can be transmitted to the input(s) of one or more drivers associated with one or more components of the apparatus 100. Thus, components such as the laser source 104, the first positioner 106, the second positioner 108, third positioner 110, the lens actuator, etc., are responsive to control signals generated by the controller 114.

In another embodiment, and although not shown, one or more additional controllers (e.g., component-specific controllers) may, optionally, be communicatively coupled to an input of a driver communicatively coupled to a component (and thus associated with the component) such as the laser source 104, the first positioner 106, the second positioner 108, the third positioner 110, the lens actuator, etc. In this embodiment, each component-specific controller can be communicatively coupled and the controller 114 and be operative to generate, in response to one or more control signals received from the controller 114, one or more control signals (e.g., trigger signals, etc.), which can then be transmitted to the input(s) of the driver(s) to which it is communicatively coupled. In this embodiment, a component-specific controller may be configured as similarly described with respect to the controller 114.

In another embodiment in which one or more component-specific controllers are provided, the component-specific controller associated with one component (e.g., the laser source 104) can be communicatively coupled to the component-specific controller associated with one component (e.g., the first positioner 106, etc.). In this embodiment, one or more of the component-specific controllers can be operative to generate one or more control signals (e.g., trigger signals, etc.) in response to one or more control signals received from one or more other component-specific controllers.

III. Embodiments Concerning Extending Lifetime of Optical Components

Generally, the apparatus 100 is configured such that optical components contained therein, such as the scan lens 112, are susceptible to laser-induced damage. Thus according to some embodiments of the present invention, an operation of one or more components selected from the group consisting of the first positioner 106, second positioner 108 and third positioner 110 can be controlled to ensure that, during laser processing, laser pulses are delivered to desired locations at the workpiece 102 while being transmitted through a region of the scan lens 112 that has not accumulated an undesirable amount of laser-induced damage. As used herein, an undesirable amount of laser-induced damage in an optical component can negatively affect the transmissivity or reflectivity of the optical component or cause the optical component to scatter light in an undesirable manner, generate debris which can undesirably accumulate on the surface of the optical component, or otherwise cause the optical component to fail catastrophically.

Figure 2:
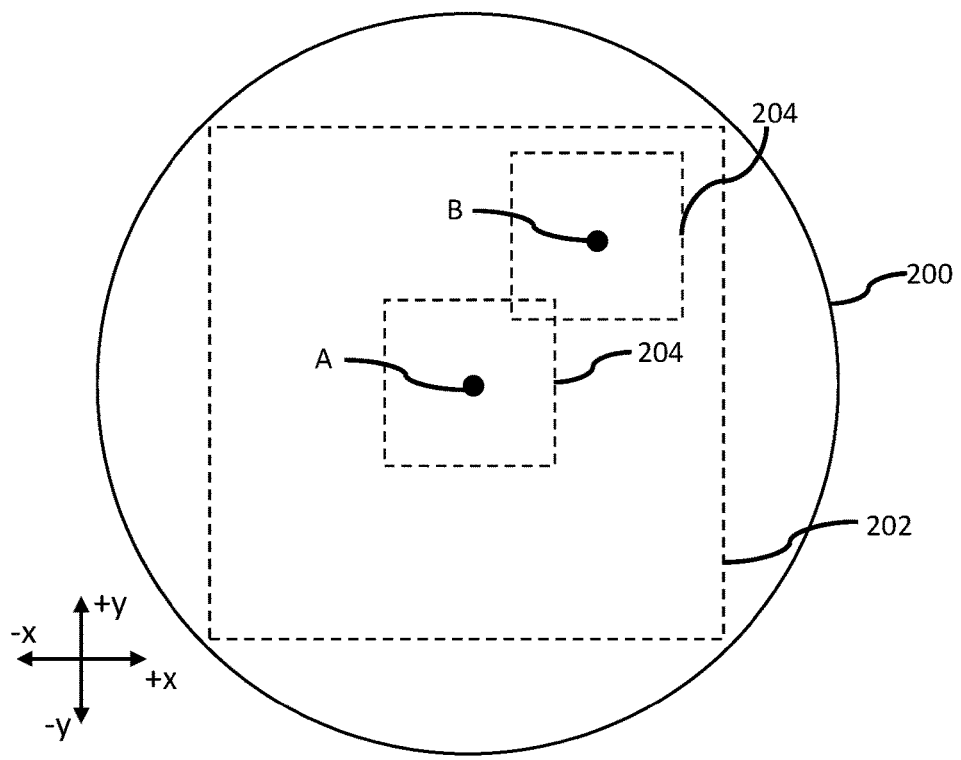
FIG. 2 illustrates a scan region within a propagation region of a scan lens included in the apparatus shown in FIG. 1, according to one embodiment.

Referring to FIG. 2, the scan lens 112 can be characterized as including a transmission region 200, though which the beam path 116 may propagate (e.g., onto the workpiece 102, along the beam axis). If the apparatus 100 includes one or more positioners such as the aforementioned first positioner 106, the second positioner 108, or a combination thereof, then the beam path 116 will typically propagate through a somewhat smaller region of the scan lens 112 (i.e., a propagation region 202). Generally, the shape and/or size of the propagation region 202 may correspond to the shape and/or size of the second scanning range projected onto the workpiece 102 (e.g., if the apparatus 100 includes the second positioner 108) or to the shape and/or size of the first scanning range projected onto the workpiece 102 (e.g., if the apparatus 100 includes the first positioner 106 but not the second positioner 108).

Although the propagation region 202 is illustrated as square in shape, it will be appreciated that the propagation region 202 may have any other desired or beneficial shape (e.g., rectangular, triangular, pentagonal, hexagonal, octagonal, elliptical, irregular, etc.) depending on, for example, the configuration and arrangement of the positioner(s) provided (e.g., the first positioner 106, the second positioner 108, the third positioner 110 or any combination thereof), the presence of any masks or other optics arranged along the beam path 116, or the like or any combination thereof. Although the propagation region 202 is illustrated as being smaller than the transmission region 200, it will be appreciated that the propagation region 202 may be the same size as the transmission region 200.

Typically, the apparatus 100 is operated so as to scan a process spot (e.g., using one or more of the first positioner 106, the second positioner 108 and the third positioner 110) along a desired trajectory to form a feature on or within a workpiece (e.g., workpiece 102). Upon scanning the process spot along the trajectory, the beam path 116 is deflected only within a relatively small field or "scan region" (e.g., scan region 204) of the propagation region 202. The portion(s) of the propagation region 202 that the beam path 116 intersects as the beam path 116 is deflected within the scan region 204 is herein referred to as a "beam path deflection route." Although the scan region 204 is illustrated as being square in shape, it will be appreciated that the scan region 204 may have any other desired or beneficial shape (e.g., rectangular, triangular, pentagonal, hexagonal, octagonal, circular, elliptical, irregular, etc.) depending on, for example, the configuration and arrangement of the positioner(s) provided, the configuration of one or more desired trajectories along which a process spot is to be scanned to form one or more features within the workpiece 102, or the like or any combination thereof. Although the scan region 204 is illustrated as being located in the center of the propagation region 202, it will be appreciated that the scan region 204 may be arranged at a different location within the propagation region 202.

Over time, as the apparatus 100 is operated to scan a process spot along one or more trajectories (e.g., to process one workpiece, or to process multiple workpieces sequentially), the scan lens 112 may accumulate laser-induced damage at one or more locations within the scan region 204. To ensure that laser pulses are not directed to a portion of the scan lens 112 that either has, or is expected to have, accumulated an undesirable amount of laser-induced damage, the location of the scan region 204 within the propagation region 202 may be shifted. Stated another way, the scan region 204 can be shifted or translated within the propagation region 202 such that the centroid, or geometric center, of the scan region 204 is shifted from a first location (e.g., location "A," as shown in FIG. 2) within the propagation region 202 to a second location (e.g., location "B," as shown in FIG. 2) within the propagation region 202. The act of shifting the centroid of the scan region 204 is herein also referred to as a "scan region shift." Scan region shifts may be performed, randomly, periodically or continuously, or the like or any combination thereof. Depending on the trajectory along which the process spot is to be scanned, laser pulses propagating through the scan region 204 after the centroid of the scan region 204 has been shifted (e.g., from location "A" to location "B") will often, if not always, propagate through a portion of the scan lens 112 that has not, nor is expected to have, accumulated an undesirable amount of laser-induced damage.

Although FIG. 2 illustrates the location of the scan region 204 as being shifted such that the scan region 204 at the second location "B" overlaps the scan region 204 at the first location "A", it will be appreciated that the location of the scan region 204 can be shifted such that the scan region 204 at the second location "B" can abut (but not overlap) the scan region 204 at the first location "A," or such that the scan region 204 at the second location "B" can be spaced apart from the scan region 204 at the first location "A." Accordingly, and assuming that laser pulses have either not propagated through a portion of the scan lens 112 outside the scan region 204 having its centroid at location "A" or that the portion of the scan lens 112 outside the scan region 204 having its centroid at location "A" has not accumulated an undesirable amount of laser-induced damage, laser pulses propagating through the scan region 204 after the centroid of the scan region 204 has been shifted (e.g., from location "A" to location "B") will always propagate through a portion of the scan lens 112 that has not, or is not expected to have, accumulated an undesirable amount of laser-induced damage.

By shifting the scan region 204 as described above, a workpiece can be processed (i.e., by scanning a process spot along one or more trajectories to form one or more features on or within the workpiece), or multiple workpieces can be sequentially processed (i.e., by scanning a process spot along one or more trajectories to form one or more features on or within multiple workpieces), while the lifetime of the scan lens 112 can be effectively extended. When processing multiple workpieces, it should be recognized that the same trajectory or different trajectories may be scanned (i.e., by a process spot) for different workpieces.

Figure 3:
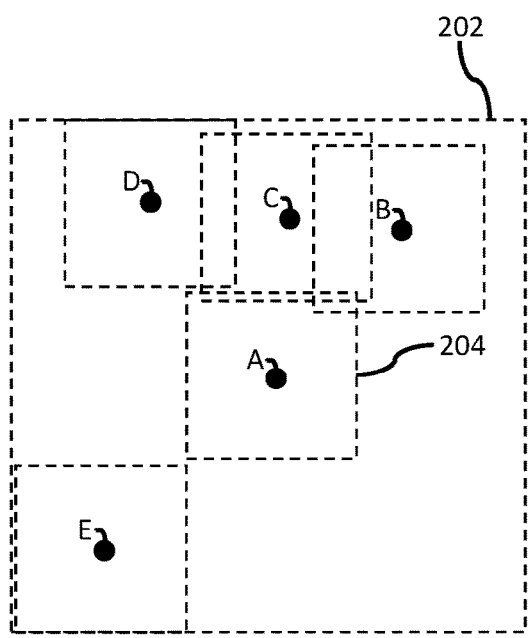
FIG. 3 illustrates an exemplary arrangement of scan regions within the propagation region of shown in FIG. 2, according to one embodiment.
Figure 4:
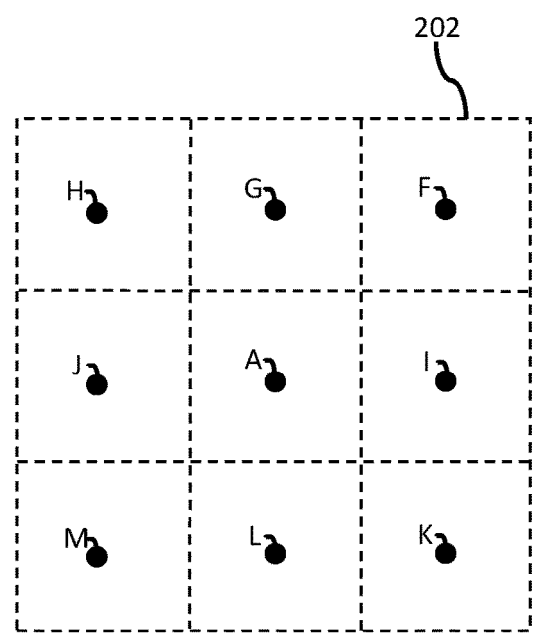
FIG. 4 illustrates an exemplary arrangement of scan regions within the propagation region of shown in FIG. 2, according to another embodiment.

Although FIG. 2 illustrates an embodiment in which the scan region 204 has been shifted only once, it will be appreciated that the scan region 204 may be shifted more than once (e.g., twice, three times, four times, five times, nine times, ten times, twenty times, thirty times, etc., or between any of these values). For example, with reference to FIG. 3, the centroid of the scan region 204 may be shifted four times (e.g., in a shift sequence moving initially from location "A" to location "B," then from location "B" to location "C," then from location "C" to location "D" and then from location "D" to location "E"). Notwithstanding the sequence outlined above, it should be recognized that the centroid of the scan region 204 can be shifted in any other suitable or desirable shift sequence (e.g., in a sequence moving initially from location "A" to location "C," then from location "C" to location "E," then from location "E" to location "D" and then from location "D" to location "B"). Likewise, in another example shown in FIG. 4, the centroid of the scan region 204 can be variously shifted in any shift sequence that moves the centroid of the scan region 204 among some or all of locations "A," "F," "G," "H," "I," "J," "K," "L" and "M". From the foregoing discussion, it should be apparent that any pair of scan regions 204 having centroids at different locations within the propagation region 202 may overlap one another, abut one another, or be spaced apart from one another. In one embodiment, each scan region 204 overlaps one or more or all other scan regions 204. Any pair of scan regions 204 having centroids at sequentially-addressed locations within the propagation region 202 may overlap one another, abut one another, or be spaced apart from one another. As used herein, a location within the propagation region 202 is "addressed" when the centroid of the scan region 204 is at, or has been shifted to, that location. Thus, if the centroid of the scan region 204 has been shifted from location "A" to location "C" (i.e., as shown in FIG. 3), then locations "A" and "C" are considered to be "sequentially-addressed locations."

The number of unique locations which can be addressed, the position of each location within the propagation region 202 that can be addressed, the number of times the scan region 204 can be shifted, and the shift sequence with which the centroid of the scan region 204 is moved, or the like or any combination thereof, may be specified by a user, operator, technician, or manufacturer of the apparatus 100 (e.g., via a user interface, not shown, communicatively coupled to the controller 114), may be determined by executing one or more algorithms (e.g., an optimization algorithm, a heuristic algorithm, a predictive algorithm, etc.), or the like or any combination thereof. Any of such algorithms can be executed based on one or more input variables representing, for example, a trajectory along which the process spot is to be scanned during operation of the apparatus 100, the number of times a particular trajectory has been scanned by the process spot, the number of hours the apparatus 100 has been operated while the particular trajectory has been scanned by the process spot, the number of workpieces that have been processed (i.e., by scanning the process spot along the particular trajectory), the wavelength of light in the laser energy to propagate through the scan lens 112 during operation of the apparatus 100, the average power or peak power of the laser energy to propagate through the scan lens 112 during operation of the apparatus 100, the pulse duration of any laser pulses to propagate through the scan lens 112 during operation of the apparatus 100, the material(s) from which the scan lens 112 is fabricated, the size of the scan lens 112, the size of the propagation region 202, the dimensions of the propagation region 202, or the like or any combination thereof.

In one embodiment, the location of the scan region 204 is shifted by obtaining (e.g., at the controller 114, at a component-specific controller, or the like or any combination thereof) one or more control signals (each herein referred to as a "first reference control signal") that could be used to control the operation of the first positioner 106 and/or the second positioner 108 to deflect the beam path 116 along a beam path deflection route (e.g., a first beam path deflection route) while scanning a process spot along a trajectory (e.g., a first trajectory), without regard to the state of the scan lens 112. Examples of such first reference control signals include a control signal that could be used to control the operation of an associated positioner such as the X-axis galvanometer mirror component, a control signal that could be used to control the operation of an associated positioner such as the Y-axis galvanometer mirror component, a control signal that could be used to control the operation of an associated positioner such as the X-axis AOD system, a control signal that could be used to control the operation of an associated positioner such as the Y-axis AOD system, or the like, or any combination thereof.

Depending upon one or more factors such as the direction of the shift (also referred to herein as "shift direction"), the distance of the shift (also referred to herein as "shift distance"), or the like or any combination thereof, one or more of such first reference control signals are then processed (e.g., by adding a positional offset thereto) to generate (e.g., at the controller 114, at a component-specific controller, or the like or any combination thereof) one or more corresponding "first modified control signals." For example, to shift the location of the scan region 204 in a first direction (e.g., in the +x direction shown in FIG. 2), a first reference control signal intended to control the operation of an associated positioner such as the X-axis galvanometer mirror component may be processed (e.g., at the controller 114, at a component-specific controller associated with the X-axis galvanometer mirror component, or the like or any combination thereof) by adding a positional offset thereto (e.g., in the +x direction, by any desired or beneficial distance). In another example, the location of the scan region 204 can be shifted in a second direction (e.g., in a direction corresponding to a vector sum of the +x and +y directions), first reference control signals intended to control the operation of associated positioners such as the X- and Y-axis galvanometer mirror components may be processed (e.g., at the controller 114, at a component-specific controller associated with the X- and/or Y-axis galvanometer mirror components, or the like or any combination thereof) by adding a positional offset to each respective first reference control signal (e.g., in the +x and +y directions, each by any desired or beneficial distance).

Once generated, a first modified control signal may be used (either alone or in conjunction with one or more other first modified control signals, one or more first reference signals, or any combination thereof) to control the operation of the positioner(s) to deflect the beam path 116 along a beam path deflection route (e.g., the first beam path deflection route, or a second beam path deflection route different from the first beam path deflection route) while scanning the process spot along a trajectory (e.g., the first trajectory, or a second trajectory different from the first trajectory). For example, to shift the location of the scan region 204 in the aforementioned first direction (i.e., in the +x direction), the aforementioned first modified control signal may be used to control the operation of the X-axis galvanometer mirror component and any other of the first reference control signals may optionally be used to control the Y-axis galvanometer mirror component, the X-axis AOD system, the Y-axis AOD system, or the like or any combination thereof, to deflect the beam path 116 along a beam path deflection route (e.g., the first beam path deflection route or the second beam path deflection route) while scanning the process spot along a trajectory (e.g., the first trajectory or the second trajectory). In another example, to shift the location of the scan region 204 in the aforementioned second direction (i.e., in a direction corresponding to a vector sum of +x and +y directions), first modified control signals may be used to control the operations of the X- and Y-axis galvanometer mirror components, and any other of the first reference control signals may optionally be used to control the X-axis AOD system, the Y-axis AOD system, or the like or any combination thereof, to deflect the beam path 116 along a beam path deflection route (e.g., the first beam path deflection route or the second beam path deflection route) while scanning the process spot along a trajectory (e.g., the first trajectory or the second trajectory).

In one embodiment, the apparatus 100 includes the third positioner 110 in addition to the first positioner 106 and/or the second positioner 108. In this case, the third positioner 110 may include a linear stage (e.g., configured to linearly move the second positioner 108 and scan lens 112, configured to linearly move the workpiece 102) or a plurality of linear stages (e.g., one configured to linearly move the second positioner 108 and scan lens 112, and another configured to linearly move the workpiece 102). The linear stage(s) of the third positioner 110 may be operated to compensate for the one or more positional offsets applied to each first reference control signal to ensure that laser energy is delivered to one or more desired locations at the workpiece 102, even when the first positioner 106 and/or the second positioner 108 are driven based on a first modified control signal. For example, if the positional offset incorporated into a first modified control signal causes the beam path 116 to be shifted by a particular distance (e.g., by a "first distance") in one direction (e.g., in the aforementioned first direction), then the third positioner 110 can be operated to compensate for the positional offset by moving the second positioner 108 and scan lens 112 by the particular distance (e.g., by the first distance) in an another direction that is opposite the first direction (e.g., in the −x direction, as shown in FIG. 2). In another example, if the positional offset incorporated into the first modified control signal causes the beam path 116 to be shifted by a particular distance (e.g., by the first distance) in one direction (e.g., in the first direction), then the third positioner 110 can be operated to compensate for the positional offset by moving the workpiece 102 by the particular distance (e.g., by the first distance) in the same direction (e.g., in the first direction).

Control signals that would otherwise be used to control the operation of the third positioner 110 (i.e., without regard to the state of the scan lens 112) during processing of the workpiece 102 (herein referred to as "second reference control signals") may be modified (e.g., at the controller 114, at a component-specific controller, etc.). For example, a second reference control signal may be modified by adding a positional offset to the command(s) therein. A second reference control signal that has been modified as discussed above is herein referred to as a "second modified control signal." A second modified control signal may be used as the control signal which controls the operation of the third positioner 110 (e.g., as discussed above) during subsequent processing of the workpiece 102. When added to the second reference control signal, the positional offset enables the laser energy to be delivered to one or more desired locations at the workpiece 102 even when the first positioner 106 and/or the second positioner 108 are driven based on a first modified control signal.

In another embodiment, the apparatus 100 does not include the third positioner 110, but the workpiece 102 may be moved manually (e.g., by a user of the apparatus 100) relative to the scan lens 112 to ensure that laser energy is delivered to one or more desired locations at the workpiece 102 when the first positioner 106 and/or the second positioner 108 are driven based on a modified control signal. Additionally, or alternatively, the scan lens 112 may be moved manually (e.g., by a user of the apparatus 100) relative to the workpiece 102 to ensure that laser energy is delivered to one or more desired locations at the workpiece 102 when the first positioner 106 and/or the second positioner 108 are driven based on a modified control signal.

Embodiments discussed herein enable reduced service costs and downtime due to replacement of optical components such as the scan lens 112. These benefits are most realized when features to be formed in workpieces are much smaller than the propagation region 202, when it is cheaper to divide a suitably large scan lens than to use and regularly replace a relatively smaller scan lens, when the scan lens 112 becomes damaged more rapidly than the optics warranty is meant to last, when movement of the beam axis imparted by the first positioner 106 is superimposed by simultaneous movement of the beam axis imparted by the second positioner 108, or the like or any combination thereof.

IV. Conclusion

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A method of operating a laser-processing system having a scan lens operative to focus laser energy propagating along a beam path and a positioner operative to deflect the beam path relative to the scan lens, wherein the positioner is operative to deflect the beam path within a propagation region of the scan lens, the method comprising:
  deflecting the beam path within a first scan region of the propagation region to process a first plurality of workpieces sequentially with the beam of laser energy propagated through the scan lens and to accumulate an undesirable amount of laser-induced damage in the scan lens within first scan region upon processing the first plurality of workpieces; and
  after processing the first plurality of workpieces by deflecting the beam path within the first scan region, deflecting the beam path within a second scan region of the propagation region to process a second plurality of workpieces sequentially, wherein an undesirable amount of laser-induced damage is absent from the scan lens within second scan region.

2. The method of claim 1, wherein the beam of laser energy includes a plurality of laser pulses.

3. The method of claim 2, wherein the plurality of laser pulses have a pulse duration that is less than 10 ps.

4. The method of claim 3, wherein the plurality of laser pulses have a pulse duration that is less than 1 ps.

5. The method of claim 1, wherein the first scan region overlaps the second scan region.

6. The method of claim 1, wherein the first scan region does not overlap the second scan region.

7. The method of claim 6, wherein the first scan region is spaced apart from the second scan region.

8. The method of claim 1, wherein
  deflecting the beam path within the first scan region comprises deflecting the beam path along a first beam path deflection route; and
  deflecting the beam path within the second scan region comprises deflecting the beam path along the first beam path deflection route.

9. The method of claim 1, further comprising, after positioning the second plurality of workpieces relative to the scan lens differently than the first plurality of workpieces in a manner that compensates for the change in deflecting the beam path within the first scan region to deflecting the beam path within the second scan region.

10. The method of claim 1, wherein imparting further comprising positioning the scan lens relative to the second plurality of workpieces differently than relative to the first plurality of workpieces in a manner that compensates for the change in deflecting the beam path within the first scan region to deflecting the beam path within the second scan region.

11. The method of claim 1, wherein
  deflecting the beam path within the first scan region of the scan lens comprises deflecting the beam path along a first beam path deflection route; and
  deflecting the beam path within the second scan region of the scan lens comprises deflecting the beam path along a second beam path deflection route different from the first beam path deflection route.

12. An apparatus, comprising:
  a laser source configured to generate a beam of laser energy, the beam of laser energy being propagatable along a beam path;
  a scan lens arranged within the beam path;
  at least one positioner arranged within the beam path and configured to deflect the beam path relative to the scan lens;
  optionally, at least one positioner configured to support a workpiece and move the workpiece relative to the scan lens; and
  a controller communicatively coupled to the at least one positioner, wherein the controller includes:
    a processor configured to generate one or more control signals to which the at least one positioner is responsive; and
    computer memory accessible by the processor, wherein the computer memory has instructions stored thereon which, when executed by the processor to cause the apparatus to perform the method as recited in claim 1.

13. A non-transitory computer-readable medium containing software instructions for configuring a processor of a laser-processing system to perform acts, the laser-processing system having a scan lens operative to focus laser energy propagating along a beam path and a positioner operative to deflect the beam path relative to the scan lens and within a propagation region of the scan lens, the acts including:
  controlling the positioner to deflect the beam path within a first scan region of the propagation region to process a first plurality of workpieces sequentially with the beam of laser energy propagated through the scan lens and to accumulate an undesirable amount of laser-induced damage in the scan lens within first scan region upon processing the first plurality of workpieces; and
  after deflecting the beam path within the first scan region, controlling the positioner to deflect the beam path within a second scan region of the propagation region to process a second plurality of workpieces sequentially, wherein an undesirable amount of laser-induced damage is absent from the scan lens within second scan region.

14. The non-transitory computer-readable medium of claim 13, wherein the software instructions are further configured the processor to perform acts including:
  deflecting the beam path within the first scan region comprises deflecting the beam path along a first beam path deflection route; and
  deflecting the beam path within the second scan region comprises deflecting the beam path along the first beam path deflection route.

15. The non-transitory computer-readable medium of claim 13, wherein the software instructions are further configured the processor to perform acts including:
  positioning the second plurality of workpieces relative to the scan lens differently than the first plurality of workpieces in a manner that compensates for the change in deflecting the beam path within the first scan region to deflecting the beam path within the second scan region.

16. The non-transitory computer-readable medium of claim 13, wherein the software instructions are further configured the processor to perform acts including:
    positioning the scan lens relative to the second plurality of workpieces differently than relative to the first plurality of workpieces in a manner that compensates for the change in deflecting the beam path within the first scan region to deflecting the beam path within the second scan region.

17. The non-transitory computer-readable medium of claim 13, wherein the software instructions are further configured the processor to perform acts including:
    deflecting the beam path within the first scan region of the scan lens by deflecting the beam path along a first beam path deflection route; and
    deflecting the beam path within the second scan region of the scan lens by deflecting the beam path along a second beam path deflection route different from the first beam path deflection route.

* * * * *